United States Patent
Tang

(10) Patent No.: US 9,678,392 B2
(45) Date of Patent: Jun. 13, 2017

(54) LIQUID CRYSTAL DISPLAY PANEL

(71) Applicant: Shenzhen China Star Optoelectronics Technology Co., Ltd., Shenzhen, Guangdong (CN)

(72) Inventor: Yuejun Tang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 180 days.

(21) Appl. No.: 14/420,902

(22) PCT Filed: Jan. 9, 2015

(86) PCT No.: PCT/CN2015/070427
§ 371 (c)(1),
(2) Date: Feb. 10, 2015

(87) PCT Pub. No.: WO2016/106814
PCT Pub. Date: Jul. 7, 2016

(65) Prior Publication Data
US 2016/0187702 A1    Jun. 30, 2016

(30) Foreign Application Priority Data
Dec. 30, 2014    (CN) .......................... 2014 1 0848763

(51) Int. Cl.
*G02F 1/1339*    (2006.01)
*G02F 1/1333*    (2006.01)

(52) U.S. Cl.
CPC ........ *G02F 1/13394* (2013.01); *G02F 1/1339* (2013.01); *G02F 1/13338* (2013.01); *G02F 2001/13396* (2013.01); *G02F 2001/13398* (2013.01)

(58) Field of Classification Search
CPC combination set(s) only.
See application file for complete search history.

(56) References Cited

U.S. PATENT DOCUMENTS

| | | | |
|---|---|---|---|
| 2007/0262967 A1* | 11/2007 | Rho | G02F 1/13338 345/173 |
| 2010/0033448 A1* | 2/2010 | Koito | G06F 3/0412 345/174 |
| 2014/0176839 A1* | 6/2014 | Oh | G09G 3/3655 349/33 |

* cited by examiner

*Primary Examiner* — Wen-Ying P Chen
(74) *Attorney, Agent, or Firm* — Andrew C. Cheng

(57) ABSTRACT

A liquid crystal display panel includes a first substrate, a second substrate, a liquid crystal layer arranged between the first and second substrates, and a secondary spacer. The secondary spacer has a bottom face fixed to the first substrate and a top face forming a gap with respect to the second substrate. The top face of the secondary spacer is provided with a first electrode and the second substrate is provided, at a location corresponding to the top face of the secondary spacer, with a second electrode. When the liquid crystal panel is driven and depressed, the first electrode electrically engages the second electrode so that a pixel electrode of the liquid crystal display panel at the depressed site is electrically connected to the ground thereby eliminating a high voltage difference between the pixel electrode and a common electrode.

17 Claims, 5 Drawing Sheets

LIQUID CRYSTAL DISPLAY PANEL

CROSS REFERENCE TO RELATED APPLICATIONS

This application claims the priority of Chinese Patent Application No. 201410848763.1, entitled "Liquid Crystal Display Panel", filed on Dec. 30, 2014, the disclosure of which is incorporated herein by reference in its entirety.

BACKGROUND OF THE INVENTION

1. Field of the Invention

The present invention relates to the field of liquid crystal displaying technology, and in particular to a liquid crystal display panel.

2. The Related Arts

Liquid crystal displays have various advantages, such as being light and thin, having low power consumption, and being free of radiation, over the traditional display devices and are widely used in various fields, including computers, mobile phones, and automobile display screens. With the wide popularization of the liquid crystal displays, people have increasingly demands for the performances of the liquid crystal displays.

Display panels of FFS and IPS modes have been widely used in daily living products. Since the liquid crystal is twisted in a plane to control the amount of light transmitting therethrough, IPS and FFS have the advantages of wide view angle and color genuineness. However, when a finger slides and presses down an FFS or IPS liquid crystal display panel, with the sliding of the finger, the liquid crystal that was lying would becomes standing up or randomly arranged. If the liquid crystal cannot resume lying very fast, then trace mura occurs, which is a phenomenon of finger touch defectiveness. In a liquid crystal display panel, the existence of trace mura greatly affects the displaying quality of the panel.

It is a goal for the industry to search persistently for a solution to improve the phenomenon of finger touch defectiveness and enhance the performance of a liquid crystal display panel.

SUMMARY OF THE INVENTION

A technical issue to be addressed in the present invention is to provide a liquid crystal display panel that improves the phenomenon of finger touch defectiveness and also enhances the performance of the liquid crystal display panel.

To achieve the above object, the present invention provides the following technical solutions:

A liquid crystal display panel comprises a first substrate, a second substrate, a liquid crystal layer arranged between the first substrate and the second substrate, and a secondary spacer. The secondary spacer has a bottom face that is fixed to the first substrate. The secondary spacer has a top face that forms a gap with respect to the second substrate. The top face of the secondary spacer is provided with a first electrode and the second substrate is provided, at a location corresponding to the top face of the secondary spacer, with a second electrode. When the liquid crystal panel is driven and depressed, the first electrode and the second electrode get in electrical engagement with each other so that a pixel electrode of the liquid crystal display panel at the depressed site is electrically connected to the ground thereby eliminating a high voltage difference between the pixel electrode and a common electrode.

In the above liquid crystal display panel, the first substrate is a color filter substrate and the second substrate is a thin-film transistor substrate. The secondary spacer is disposed on a black matrix of the first substrate. The first substrate comprises a conduction line thereon. The conduction line is electrically connected to the first electrode and extends along a side surface of the secondary spacer to reach the black matrix and further extends on and along the black matrix to an edge of the first substrate. The liquid crystal display panel further comprises a circuit board. The conduction line is electrically connected to the ground of the circuit board. The second substrate comprises thereon the pixel electrode and the common electrode. The second electrode is an extension electrode extending from the pixel electrode.

In the above liquid crystal display panel, the first substrate is a thin-film transistor substrate and the second substrate is a color filter substrate. The first substrate is provided a pixel electrode and a common electrode. The first electrode is an extension electrode extending from the pixel electrode. The second electrode is disposed on a black matrix of the second substrate. The second substrate is provided with a conduction line. The conduction line is electrically connected to the second electrode and extends along the black matrix to an edge of the second substrate. The liquid crystal display panel further comprises a circuit board. The conduction line is electrically connected to the ground of the circuit board.

In the above liquid crystal display panel, the first electrode and the second electrode are of the same shape and are opposite to each other.

In the above liquid crystal display panel, the pixel electrode and the common electrode receive therebetween an insulation layer. The insulation layer is set on and covers a surface of the common electrode. The pixel electrode is set on and covers a surface of the insulation layer.

In the above liquid crystal display panel, the pixel electrode has a surface on which an alignment film is set. A location corresponding to the first electrode and the second electrode is not covered by the alignment film so that the first electrode and the second electrode are exposed to oppose each other.

In the above liquid crystal display panel, the number of the secondary spacer used is plural. Each pixel of the liquid crystal display panel comprises at least one secondary spacer. The numbers of the first electrode and the second electrode used are correspondingly plural.

In the above liquid crystal display panel, the liquid crystal display panel further comprises a plurality of primary spacers. The primary spacers each have an end fixed to the first substrate. An opposite end of the primary spacer is close to or in engagement with the second substrate. The primary spacers are raised from the first substrate by a vertical height that is greater than a vertical height by which the secondary spacers are raised from the first substrate.

In the above liquid crystal display panel, the first electrode and the second electrode comprises materials of ITO, AL, or Mo.

In the above liquid crystal display panel, the liquid crystal display panel adopts positive/negative voltage driving.

The present invention provides an arrangement of a first electrode and a second electrode so that when a liquid crystal panel is driven and depressed, the first electrode and the second electrode get in electrical conduction with each other to make a pixel electrode of the liquid crystal display panel at the depressed site electrically connected to the ground thereby eliminating a high voltage difference between a pixel electrode and a common electrode. Since the high voltage difference has been eliminated, liquid crystal molecules that stand up after being depressed could fast lie down due to being not supported by a strong erection electric field so as to avoid trace mura, namely the phenomenon of finger touch defectiveness.

BRIEF DESCRIPTION OF THE DRAWINGS

To more clearly illustrate the technical solutions proposed in the present invention, a brief description of the drawings that are necessary for describing embodiments of the present invention is given below. It is obvious that the drawings that will be described below show only some embodiments of the present invention and for those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of the embodiments of the present invention with reference to the attached drawings of the embodiments of the present invention.

Figure 1:
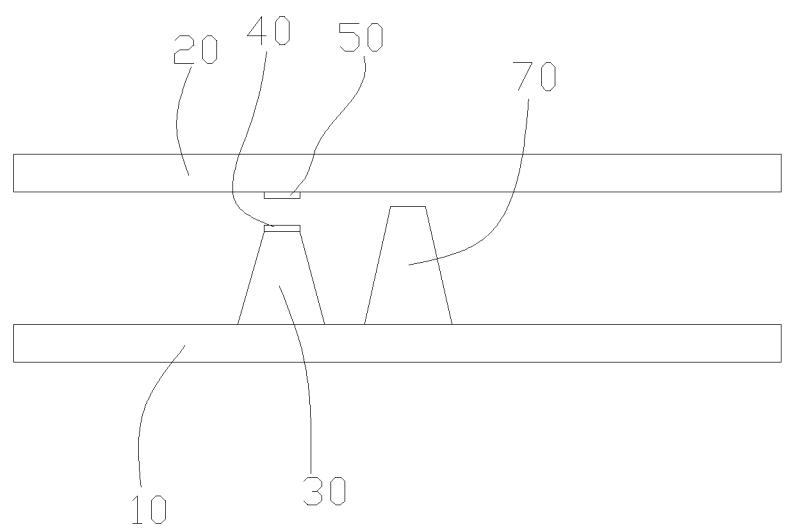
FIG. 1 is a schematic view, in an enlarged form, showing a cross section of a liquid crystal display panel according to an embodiment of the present invention.

Referring to FIG. 1, the present invention relates to a liquid crystal display panel, which comprises a first substrate 10, a second substrate 20, a liquid crystal layer (not shown) arranged between the first substrate 10 and the second substrate 20, and a secondary spacer 30. The secondary spacer 30 is arranged between the first substrate 10 and the second substrate 20. Specifically speaking, the secondary spacer 30 has a bottom face that is fixed to the first substrate 10 and the secondary spacer 30 has a top face that forms a gap with respect to the second substrate 20. The top face of the secondary spacer 30 is provided with a first electrode 40. The first electrode 40 is a block like electrode. The second substrate 20 is provided, at a location corresponding to the top face of the secondary spacer 30, with a second electrode 50. When the liquid crystal panel is not depressed, the first electrode 40 and the second electrode 50 maintain the gap therebetween and when the liquid crystal panel is driven and depressed, the first electrode 40 and the second electrode 50 get in conduction with each other so that the pixel electrode of the liquid crystal display panel at the depressed site is electrically connected to the ground thereby eliminating a high voltage difference between the pixel electrode and the common electrode.

The pixel electrode and the common electrode can be mounted on the first substrate 10 or can alternatively be mounted on the second substrate 20, and no limitation is imposed to the specific structures thereof provided that the pixel electrode is electrically connectable with the ground to achieve the elimination of the high voltage difference between the pixel electrode and the common electrode.

Specifically speaking, the liquid crystal display panel adopts positive/negative voltage driving. The first electrode 40 and the second electrode 50 comprise materials of ITO, AL, or Mo.

The present invention provides an arrangement of a first electrode 40 and a second electrode 50 so that when a liquid crystal panel is driven and depressed, the first electrode 40 and the second electrode 50 get in electrical conduction with each other to make a pixel electrode of the liquid crystal display panel at the depressed site electrically connected to the ground thereby eliminating a high voltage difference between a pixel electrode and a common electrode. Since the high voltage difference has been eliminated, liquid crystal molecules that stand up after being depressed could fast lie down due to being not supported by a strong erection electric field so as to avoid trace mura, namely the phenomenon of finger touch defectiveness.

Figure 2:
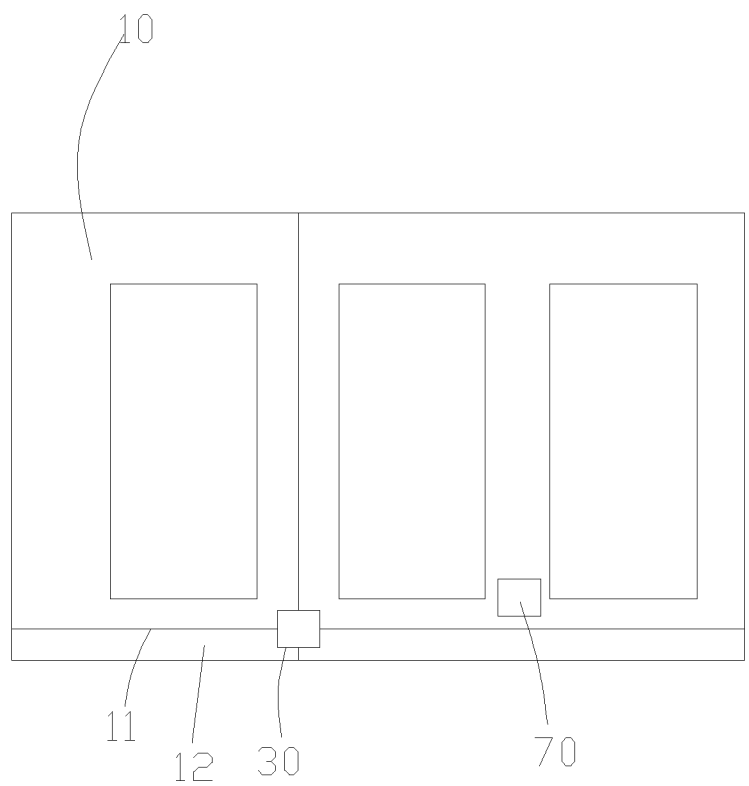
FIG. 2 is a schematic view showing a first substrate of the liquid crystal display panel according to the embodiment of the present invention illustrated in FIG. 1.

In a first embodiment of the present invention, referring collectively to FIGS. 1 and 2, the first substrate 10 is CF (Color Filter) substrate and the second substrate 20 is a TFT (Thin-Film Transistor) substrate. The secondary spacer 30 is located on a black matrix of the first substrate 10 (namely the CF substrate). The first substrate 10 is provided thereon with a conduction line 11. The conduction line 11 is electrically connected to the first electrode 40 and extends along a side surface of the secondary spacer 30 to reach the black matrix 12 and further extends on and along the black matrix 12 to an edge of the first substrate 10. The liquid crystal display panel further comprises a circuit board (not shown) and the conduction line 11 is electrically connected to the ground potential of the circuit board. Specifically speaking, a golden ball is used to electrically connect the conduction line 11 of the first substrate to a conductor pad of the second substrate 20. The conductor pad can be a metal pad or an electrode. And, further electrical connection is made through the conductor pad of the second substrate 20 to the ground of the circuit on the second substrate 20.

Figure 3:
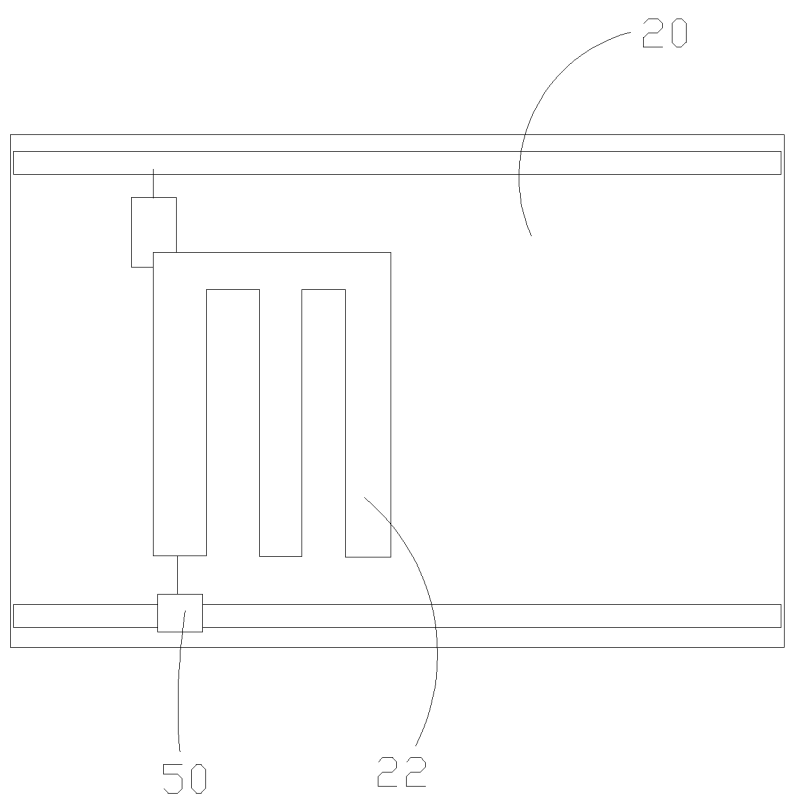
FIG. 3 is a schematic view showing a second substrate of the liquid crystal display panel according to a first embodiment of the present invention.

As shown in FIG. 3, the second substrate 20 is provided with a pixel electrode 22 and a common electrode (not labeled). The second electrode 50 is an extension electrode extending from the pixel electrode 22. In other words, the second electrode 50 is electrically connected to the pixel electrode 22 of the second substrate 20, where the connection can be achieved with a conductor line or the pixel electrode is extended to allow a portion of the pixel electrode 22 to serve as the second electrode 50.

Figure 4:
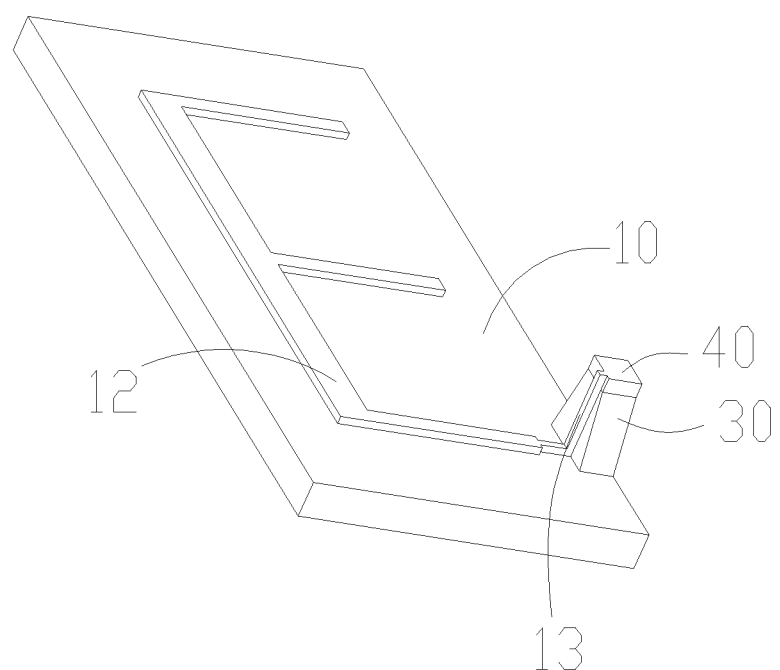
FIG. 4 is a schematic view showing a second substrate of the liquid crystal display panel according to a second embodiment of the present invention.

In a second embodiment of the present invention, the first substrate 10 is a TFT substrate and the second substrate 20 is a CF substrate. Referring to FIGS. 1 and 4, the first substrate 10 is provided with a pixel electrode 12 and a common electrode (not shown). The secondary spacer 30 is disposed on the first substrate 10 at a location close to the pixel electrode 12. A conductor line 13 is used to electrically connect the first electrode 40 to the pixel electrode 12. In other words, the first electrode 40 is an extension electrode extending from the pixel electrode 12. The second electrode 50 is located on the black matrix of the second substrate 20 and the second electrode 50 is set at a location corresponding to the first electrode 40. The second substrate 20 is provided with a conduction line 11 and the conduction line 11 is electrically connected to the second electrode 50 and extends along the black matrix to an edge of the second substrate 20.

Specifically speaking, in the present invention, the first electrode 40 and the second electrode 50 are of the same shape and can both be square or circular and they are opposite to each other.

Figure 5:
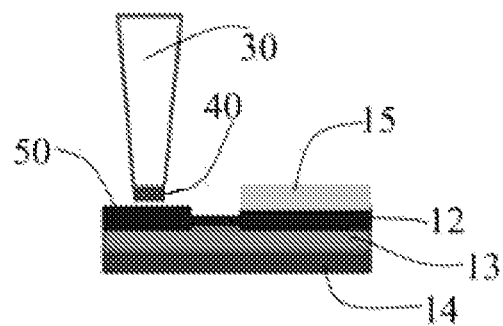
FIG. 5 is schematic view illustrating a structural relationship between a pixel electrode and a common electrode of the liquid crystal display panel according to an embodiment of the present invention.

In an embodiment, as shown in the specific structure between the pixel electrode 12 and the common electrode 14 illustrated in FIG. 5, the pixel electrode 12 and the common electrode 14 receive therebetween an insulation layer 13 in such a way that the pixel electrode 12, the insulation layer 13, and the common electrode 14 overlap each other. The insulation layer 13 is set on and covers a surface of the common electrode 14 and the pixel electrode 12 is set on and covers a surface of the insulation layer 13. The pixel electrode 12 has a surface on which an alignment film 15 is set. The location corresponding to the first electrode 40 and the second electrode 50 is not covered by the alignment film 15 so that the first electrode 40 and the second electrode 50 are exposed to oppose each other.

Figure 6:
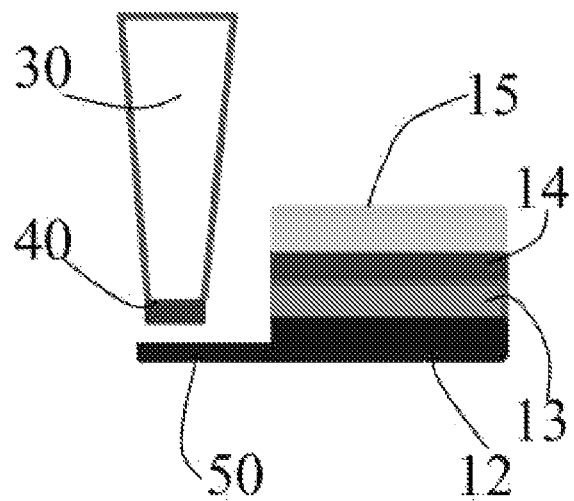
FIG. 6 is schematic view illustrating a structural relationship between a pixel electrode and a common electrode of the liquid crystal display panel according to another embodiment of the present invention.

In another embodiment, as shown in FIG. 6, the pixel electrode 12 may be alternatively set as a bottom layer; the insulation layer 13 is set on and covers a surface of the pixel electrode 12; and the common electrode 14 is set at an outer layer and the common electrode 14 covers the insulation layer 13. In the instant embodiment, it needs to arrange the extension electrode of the pixel electrode 12 at a location where no portion of the insulation layer 13 and the common electrode 14 is present so as to have the extension electrode of the pixel electrode 12, namely the second electrode 50, exposed directly. In the instant embodiment, the alignment film 15 is disposed on a surface of the common electrode 14. Similarly, the location corresponding to the first electrode 40 and the second electrode 50 is not covered by the alignment film 15 so that the first electrode 40 and the second electrode 50 are exposed to oppose each other.

The number of the secondary spacer 30 used can be plural. The secondary spacer 30 can be cylindrical, circular frustum, or rectangular prism. Each pixel of the liquid crystal display panel is provided with at least one secondary spacer 30. Correspondingly, the numbers of the first electrode 40 and the second electrode 50 used are also plural.

The liquid crystal display panel may further comprise a plurality of primary spacers 70 (as shown in FIGS. 1 and 2). The primary spacers 70 each have an end fixed to the first substrate 10 and an opposite end of the primary spacer is close to or in engagement with the second substrate 20. The vertical height of the primary spacers 70 raised from the first substrate 10 is greater than the vertical height of the secondary spacers 30 raised from the first substrate 10. The primary spacers 70 provide a function of supporting between the first substrate 10 and the second substrate 20. Specifically speaking, the primary spacers 70 have a distribution density that is smaller than a distribution density of the secondary spacers 30. The primary spacers 70 can be uniformly distributed among the secondary spacers 30. In other embodiments, the primary spacers 70 and the secondary spacers 30 may be of the same height; however, the substrate that is opposite to the primary spacers 70 is provided with projections at locations exactly corresponding to the primary spacers so that the projections are engageable with the primary spacers 70 to allow them to collectively provide the function of supporting.

Disclosed above are only the preferred embodiments of the present invention. It is appreciated that those having ordinary skills of the art may readily appreciate various improvements and modifications without departing from the principle of the present invention and these improvements and modifications are considered within the protection scope of the present invention.

What is claimed is:

1. A liquid crystal display panel, comprising a first substrate, a second substrate, a liquid crystal layer arranged between the first substrate and the second substrate, and a secondary spacer, the secondary spacer having a bottom face that is fixed to the first substrate, the secondary spacer having a top face that forms a gap with respect to the second substrate, wherein the top face of the secondary spacer is provided with a first electrode and the second substrate is provided, at a location corresponding to the top face of the secondary spacer, with a second electrode, whereby when the liquid crystal panel is driven and depressed, the first electrode and the second electrode get in electrical engagement with each other so that a pixel electrode of the liquid crystal display panel at the depressed site is electrically connected to the ground thereby eliminating a high voltage difference between the pixel electrode and a common electrode;

wherein the liquid crystal display panel adopts positive/negative voltage driving; and wherein the first substrate is a color filter substrate and the second substrate is a thin-film transistor substrate, the secondary spacer being disposed on a black matrix of the first substrate, the first substrate comprising a conduction line thereon, the conduction line being electrically connected to the first electrode and extending along a side surface of the secondary spacer to reach the black matrix and further extending on and along the black matrix to an edge of the first substrate, the liquid crystal display panel further comprising a circuit board, the conduction line being electrically connected to the ground of the circuit board, the second substrate comprising thereon the pixel electrode and the common electrode, the second electrode being an extension electrode extending from the pixel electrode.

2. The liquid crystal display panel as claimed in claim 1, wherein the first electrode and the second electrode are of the same shape and are opposite to each other.

3. The liquid crystal display panel as claimed in claim 1, wherein the pixel electrode and the common electrode receive therebetween an insulation layer, the insulation layer being set on and covering a surface of the common electrode, the pixel electrode being set on and covering a surface of the insulation layer.

4. The liquid crystal display panel as claimed in claim 3, wherein the pixel electrode has a surface on which an alignment film is set, a location corresponding to the first electrode and the second electrode being not covered by the alignment film so that the first electrode and the second electrode are exposed to oppose each other.

5. The liquid crystal display panel as claimed in claim 1, wherein the number of the secondary spacer used is plural, each pixel of the liquid crystal display panel comprising at least one secondary spacer, the numbers of the first electrode and the second electrode used being correspondingly plural.

6. The liquid crystal display panel as claimed in claim 5, wherein the liquid crystal display panel further comprises a plurality of primary spacers, the plurality of primary spacers being arranged adjacent to the secondary spacers so that the primary spacers and the secondary spacers correspond to each other in a one-by-one manner, the primary spacers each having an end fixed to the first substrate, an opposite end of the primary spacer being close to or in engagement with the second substrate, the primary spacers being raised from the first substrate by a vertical height that is greater than a vertical height by which the secondary spacers are raised from the first substrate.

7. The liquid crystal display panel as claimed in claim 1, wherein the first electrode and the second electrode comprises materials of ITO, AL, or Mo.

8. A liquid crystal display panel, comprising a first substrate, a second substrate, a liquid crystal layer arranged between the first substrate and the second substrate, and a secondary spacer, the secondary spacer having a bottom face that is fixed to the first substrate, the secondary spacer having a top face that forms a gap with respect to the second substrate, wherein the top face of the secondary spacer is provided with a first electrode and the second substrate is provided, at a location corresponding to the top face of the secondary spacer, with a second electrode, whereby when the liquid crystal panel is driven and depressed, the first electrode and the second electrode get in electrical engagement with each other so that a pixel electrode of the liquid crystal display panel at the depressed site is electrically connected to the ground thereby eliminating a high voltage difference between the pixel electrode and a common electrode;

wherein the first substrate is a color filter substrate and the second substrate is a thin-film transistor substrate, the secondary spacer being disposed on a black matrix of the first substrate, the first substrate comprising a conduction line thereon, the conduction line being electrically connected to the first electrode and extending along a side surface of the secondary spacer to reach the black matrix and further extending on and along the black matrix to an edge of the first substrate, the liquid crystal display panel further comprising a circuit board, the conduction line being electrically connected to the ground of the circuit board, the second substrate comprising thereon the pixel electrode and the common electrode, the second electrode being an extension electrode extending from the pixel electrode.

9. The liquid crystal display panel as claimed in claim 8, wherein the first electrode and the second electrode are of the same shape and are opposite to each other.

10. The liquid crystal display panel as claimed in claim 8, wherein the pixel electrode and the common electrode receive therebetween an insulation layer, the insulation layer being set on and covering a surface of the common electrode, the pixel electrode being set on and covering a surface of the insulation layer.

11. The liquid crystal display panel as claimed in claim 10, wherein the pixel electrode has a surface on which an alignment film is set, a location corresponding to the first electrode and the second electrode being not covered by the alignment film so that the first electrode and the second electrode are exposed to oppose each other.

12. The liquid crystal display panel as claimed in claim 8, wherein the number of the secondary spacer used is plural, each pixel of the liquid crystal display panel comprising at least one secondary spacer, the numbers of the first electrode and the second electrode used being correspondingly plural.

13. A liquid crystal display panel, comprising a first substrate, a second substrate, a liquid crystal layer arranged between the first substrate and the second substrate, and a secondary spacer, the secondary spacer having a bottom face that is fixed to the first substrate, the secondary spacer having a top face that forms a gap with respect to the second substrate, wherein the top face of the secondary spacer is provided with a first electrode and the second substrate is provided, at a location corresponding to the top face of the secondary spacer, with a second electrode, whereby when the liquid crystal panel is driven and depressed, the first electrode and the second electrode get in electrical engagement with each other so that a pixel electrode of the liquid crystal display panel at the depressed site is electrically connected to the ground thereby eliminating a high voltage difference between the pixel electrode and a common electrode;

wherein the first substrate is a thin-film transistor substrate and the second substrate is a color filter substrate, the first substrate being provided a pixel electrode and a common electrode, the first electrode being an extension electrode extending from the pixel electrode, the second electrode being disposed on a black matrix of the second substrate, the second substrate being provided with a conduction line, the conduction line being electrically connected to the second electrode and extending along the black matrix to an edge of the second substrate, the liquid crystal display panel further comprising a circuit board, the conduction line being electrically connected to the ground of the circuit board.

14. The liquid crystal display panel as claimed in claim 13, wherein the first electrode and the second electrode are of the same shape and are opposite to each other.

15. The liquid crystal display panel as claimed in claim 13, wherein the pixel electrode and the common electrode receive therebetween an insulation layer, the insulation layer being set on and covering a surface of the common electrode, the pixel electrode being set on and covering a surface of the insulation layer.

16. The liquid crystal display panel as claimed in claim 15, wherein the pixel electrode has a surface on which an alignment film is set, a location corresponding to the first electrode and the second electrode being not covered by the alignment film so that the first electrode and the second electrode are exposed to oppose each other.

17. The liquid crystal display panel as claimed in claim 13, wherein the number of the secondary spacer used is plural, each pixel of the liquid crystal display panel comprising at least one secondary spacer, the numbers of the first electrode and the second electrode used being correspondingly plural.

* * * * *